US008240602B1

(12) United States Patent
Lloyd et al.

(10) Patent No.: US 8,240,602 B1
(45) Date of Patent: Aug. 14, 2012

(54) SUBSEA DEPLOYMENT OF AERIAL PAYLOADS UTILIZING LONG-TERM STORAGE OF LIGHTER THAN AIR GASES

(75) Inventors: Jeffrey M. Lloyd, San Diego, CA (US); Carol A. Becker, Del Mar, CA (US); Brandon J. Wiedemeier, San Diego, CA (US); Jack Y. Dea, San Diego, CA (US); Rosteslaw M. Husar, El Cajon, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 197 days.

(21) Appl. No.: 12/835,435

(22) Filed: Jul. 13, 2010

(51) Int. Cl.
*B64B 1/40* (2006.01)
*B64F 1/04* (2006.01)
(52) U.S. Cl. ............................................ 244/63; 244/31
(58) Field of Classification Search .................. 244/98, 244/63, 33, 31, 24, 107; 441/30, 31; 343/706; 89/1.809, 1.81
See application file for complete search history.

(56) References Cited

U.S. PATENT DOCUMENTS

| | | | |
|---|---|---|---|
| 2,569,977 A | 10/1951 | Dickinson | |
| 4,123,813 A | 11/1978 | Adams | |
| 4,281,427 A * | 8/1981 | Petters | 441/30 |
| 4,433,638 A | 2/1984 | Ashline | |
| 4,861,297 A | 8/1989 | Warnan et al. | |
| 5,231,952 A | 8/1993 | Tenniswood | |
| 6,653,005 B1 | 11/2003 | Muradov | |
| 2004/0059476 A1* | 3/2004 | Nichols | 701/21 |
| 2006/0257313 A1* | 11/2006 | Cisar et al. | 423/648.1 |

FOREIGN PATENT DOCUMENTS

WO 2006/104607 A2 10/2006
* cited by examiner

*Primary Examiner* — Tien Dinh
*Assistant Examiner* — Richard R Green
(74) *Attorney, Agent, or Firm* — Kyle Eppele; J. Eric Anderson

(57) ABSTRACT

A lighter than air (LTA) balloon and payload for the LTA balloon are stored on or in an underwater launcher. The launcher provides a source for a supply of a lighter than air gas, which is operatively connected to the LTA balloon until release. On deployment, the lighter than air gas is generated. The LTA balloon is deployed by activating the launcher to fill the LTA balloon and then releases the LTA balloon.

17 Claims, 8 Drawing Sheets

SUBSEA DEPLOYMENT OF AERIAL PAYLOADS UTILIZING LONG-TERM STORAGE OF LIGHTER THAN AIR GASES

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Reference Navy Case No. 100081.

CROSS-REFERENCE TO RELATED APPLICATIONS

This application and U.S. patent application Ser. No. 12/835,477 (Navy Case 100093) filed 13 Jul. 2010, share some common material and are commonly assigned. The aforementioned U.S. patent application Ser. No. 12/835,477 is incorporated herein by reference in its entirety.

BACKGROUND

This disclosure relates to lighter than air vehicles and the launch of lighter than air vehicles from the subsea environment.

SUMMARY

Deployment of a lighter than air (LTA) balloon is performed by storing the LTA balloon and a payload for the LTA balloon on an underwater storage and launch container and providing a source for a supply of a lighter than air gas. The lighter than air gas is operatively connected to the LTA balloon and an underwater launcher is deployed in an underwater location. The deployment of the LTA balloon is made by activating the launcher to fill the LTA balloon and release the LTA balloon.

BRIEF DESCRIPTION OF THE DRAWINGS

FIG. 1A depicts initial launch. FIG. 1B depicts the balloon continuing to fill after initial launch. FIG. 1C shows the continuation of the fill process. FIG. 1D depicts the launch container being pulled upward during the fill process. FIG. 1E depicts the container being pulled toward the water surface by its balloon. FIG. 1F depicts the balloon and its payload pulling away from its storage and launch container. FIG. 1G depicts fill tube separating. FIG. 1H depicts the balloon completely separated from the launch container.

FIG. 3A shows the container tethered to the anchor, and FIG. 3B shows the container untethered during balloon launch.

DETAILED DESCRIPTION

Figure 1A:
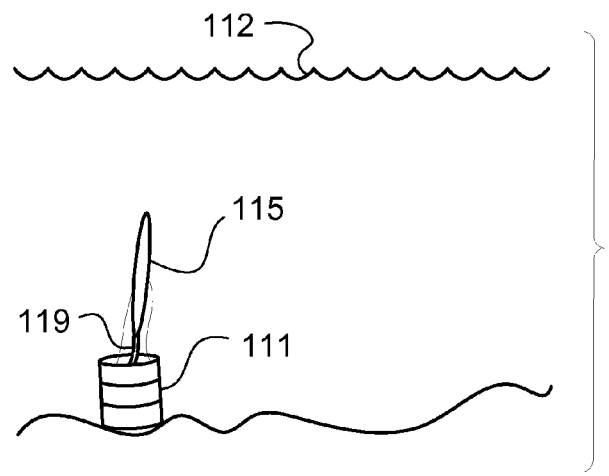
FIGS. 1A-1H are diagrams showing deployment of an LTA balloon from an underwater launch site.

Certain vehicles use hydrogen as a motive gas. These include Lighter Than Air (LTA) balloons and vehicles which are capable of using hydrogen as a prime mover fuel. In cases in which the hydrogen is intended to be used at a time in the future, it is useful to store the gas; however, storage of hydrogen gas may present problems. Potential problems include the maintenance of storage vessels, in some cases the space or volume used for storage, the possibility of leakage and the potential hazard of storing compressed hydrogen gas.

LTA balloons or lift balloons can be deployed for a number of purposes, the most familiar being weather observation, and sensing. Among other things, LTA balloons are useful as communications relays.

In instances where a communications relay is required, the balloon is launched in the area where the communications are needed, and caused to ascend to an operational flight altitude, typically in the range of 10,000 to 20,000 meters.

In order to launch a balloon, it is necessary to provide a lighter than air gas, such as hydrogen. Prior to launch, the hydrogen must be stored unless supplied to the balloon from external sources at the time of launch.

In some operational environments, an LTA balloon may be stored underwater and launched from the underwater location. The storage time underwater may be substantial, at times extending for several months or several years. For underwater launches, the same long-term considerations apply regarding storage of the gas. The system is designed to be able to store hydrogen indefinitely, allowing the launcher to sit underwater until needed. Once activated, the storage system will provide hydrogen and launch the given payload to altitude from the sea floor.

Launching an LTA balloon from beneath the ocean surface is convenient for a number of reasons. Underwater balloon launchers can easily be pre-positioned in hostile regions and would be ready for launch deployment by virtue of their pre-positioning. The pre-positioning is considered pre-launch deployment. Pre-launch deployment is performed by pre-staging the LTA balloon so that the LTA balloon is ready for deployment at a desired location. In the case of underwater or pre-launch deployment, the seawater orients the balloon correctly, which facilitates launch. In contrast, surface balloon launches require that the balloon be laid out on the deck of a ship or on the ground, and requires multiple personnel in order to orient the balloon during filling with the hydrogen.

Currently, LTA balloon aerial vehicles use compressed gas to fill balloons and launch from a surface platform. The current method of gas storage is highly prone to leakage, and is less convenient in the case of underwater launchers. Compressed gas can be stored underwater, which reduces leakage due to differential pressure, but exposes the underwater storage vessel to the underwater environment.

It is desired to increase the storage life of lighter than air gases for use in LTA balloons. This is convenient both prior to pre-launch deployment (storage of the LTA vehicle before underwater deployment) and after pre-launch deployment of the LTA balloon at a launch site.

FIGS. 1A-1H are diagrams showing deployment of an LTA balloon from an underwater launch site. Deployment includes pre-launch deployment and active deployment. "Pre-launch deployment" is a general field deployment, by which a launcher is placed at a desired underwater location where the balloon is ready for active deployment. "Active deployment" refers to the actual inflation and launch of the balloon, in which the balloon with its payload is launched.

Prior to launch, the balloon and its payload are stored in a storage and launch container, which also provides a housing for a hydrogen generator. The storage container can remain at an underwater location and can be deployed to the pre-launch deployment site by any convenient means, such as ship or aircraft.

Figure 1B:
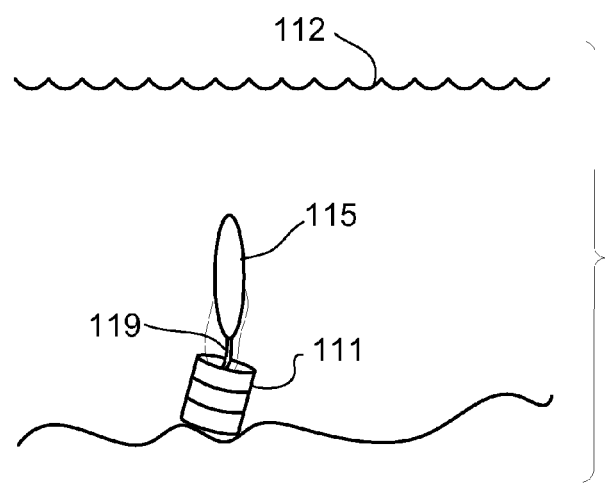

FIG. 1A depicts initial launch. On launch, storage and launch container 111, located below the water surface 112, opens and allows balloon 115 to escape. At this time, hydrogen is being generated from within launch container 111, and is provided to balloon 115 through fill tube 119. The initial amount of gas causes balloon 115 to become buoyant and rise above launch container 111. In FIG. 1B, balloon 115 continues to fill. In the underwater environment, the balloon 115 remains mostly collapsed due to water pressure; however, the hydrogen in the compressed state is significantly lighter than the seawater and is therefore buoyant. The buoyancy helps the balloon 115 to remain upright and pull away from the storage and launch container 111. This eliminates the requirement for supporting the balloon's envelope during launch, which is typically performed by a launch crew for surface-launched and shipboard-launched balloons.

Figure 1C:
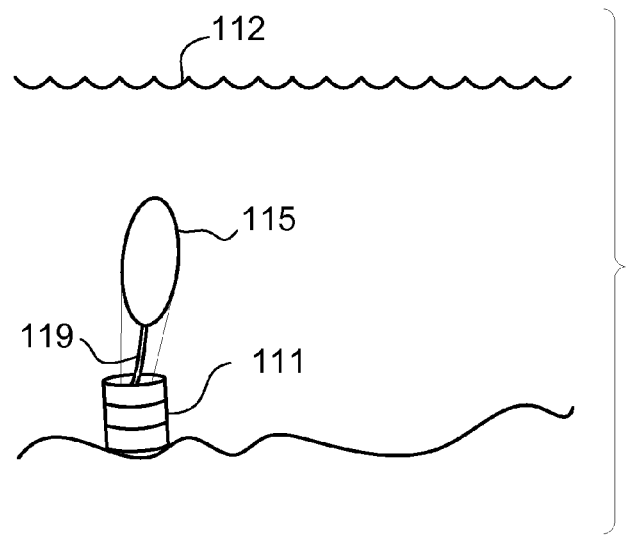
Figure 1D:
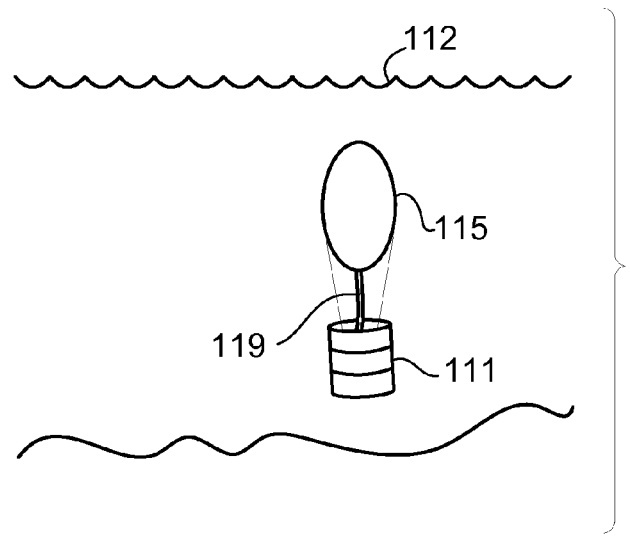

FIG. 1C shows the continuation of the fill process. As balloon 115 expands, storage and launch container 111 at first remains on the sea floor. If the storage and launch container 111 is light enough, it will start to be pulled upward, as depicted in FIG. 1D.

Figure 1E:
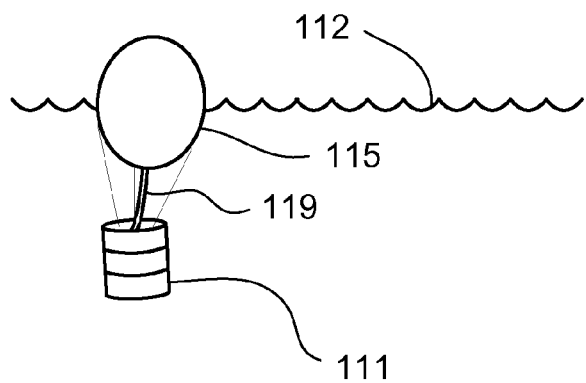
Figure 1F:
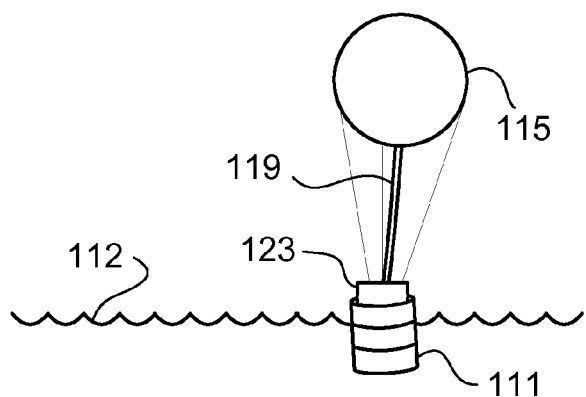
Figure 1G:
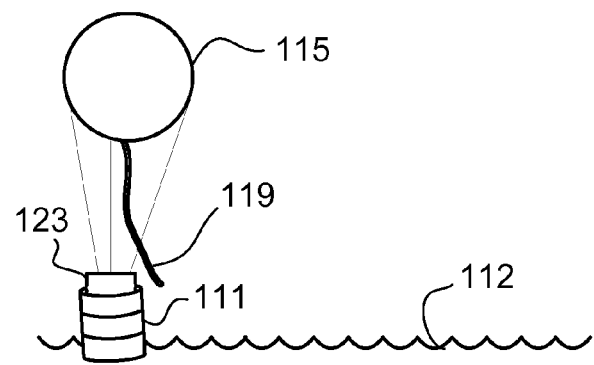
Figure 1H:
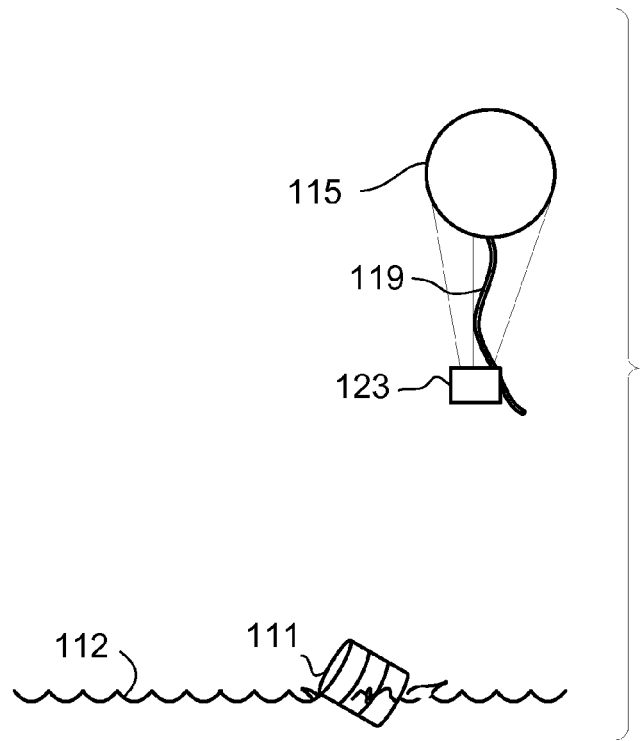

Referring to FIG. 1E, container 111 is pulled toward the water surface 112 by its balloon 115, and balloon 115 surfaces. This can occur either before or after release of the balloon from storage and launch container 111. During launch, balloon 115 pulls away from its storage and launch container 111, as depicted in FIG. 1F. This results in payload 123 being pulled away from container 111. As depicted in FIG. 1G, fill tube 119 separates either from container 111 (as shown) or from balloon 115. Balloon 115 then completely separates from launch container 111, as depicted in FIG. 1H.

The storage and launch container 111 must be positioned in such a way that balloon 115 can escape. In part, this is accomplished by arranging storage container 111 so that it is bottom heavy. In the event that storage and launch container 111 is positioned inopportunely on the sea floor, the proper positioning of the storage and launch container 111 can be assisted by the initiation of hydrogen generation. The hydrogen serves to lighten the storage and launch container at one end and permits the balloon to escape upward, or at least away from the sea floor. Alternatively, the storage and launch container can open in a manner which accommodates the escape of the balloon at the time of opening.

The above description of a balloon launch is given as a non-limiting example. It is possible to launch the balloon 115 with the storage and launch container 111 remaining below sea level or on the sea floor. It is also anticipated that the particular configuration of the storage and launch container 111 may vary.

Figure 2:
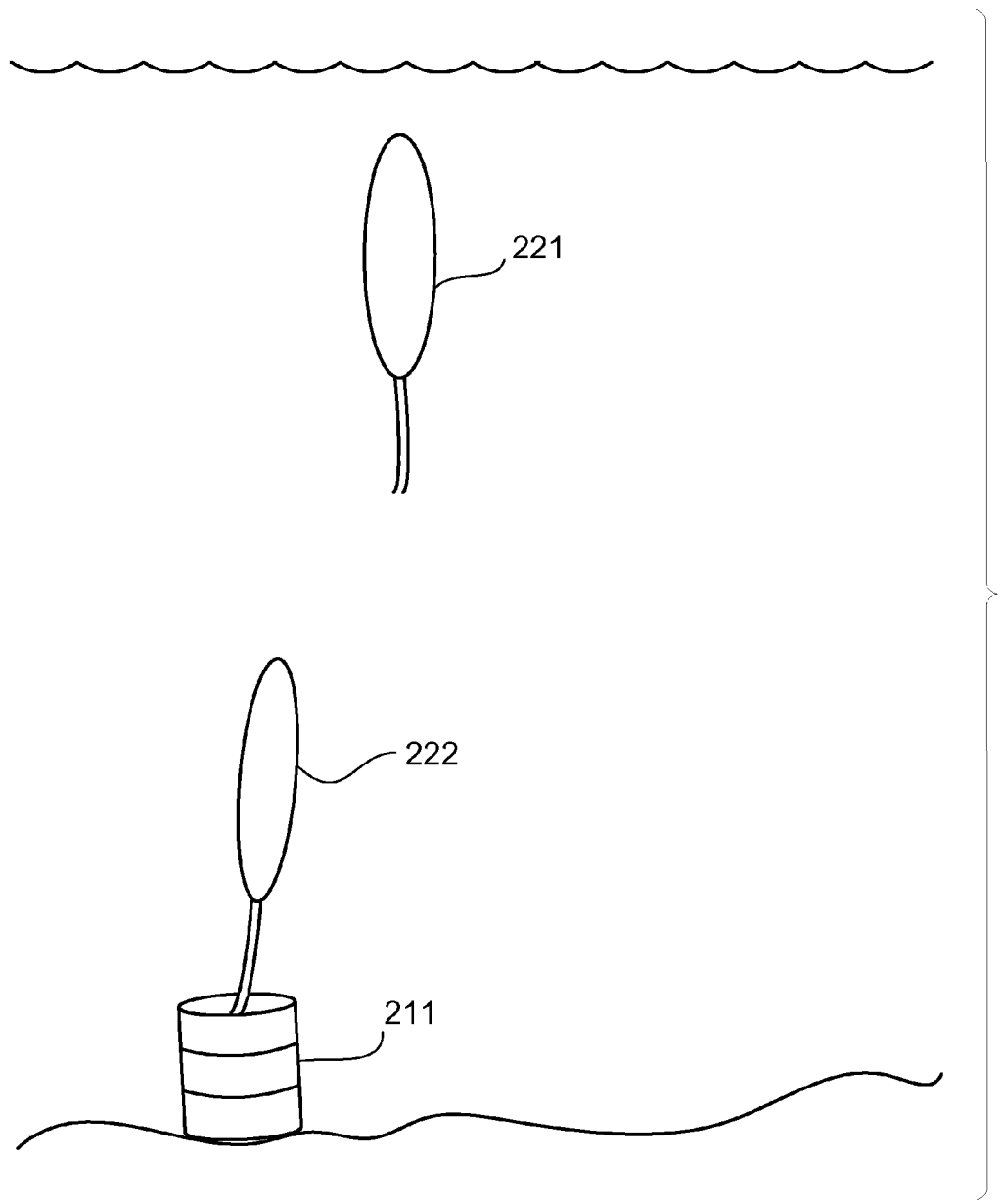
FIG. 2 is a diagram showing the launch of multiple balloons.

It is also possible to permit multiple balloon launches to be performed from a single storage and launch container. Since the operational launch deployment results in the balloon ultimately drifting beyond a desired area, it is anticipated that for any set of conditions, more than one balloon launch, staggered in time, may be desired in order to maintain balloon coverage over a particular area. Such multiple balloon launches may be achieved with one set of hydrogen generation apparatus 211 launching multiple balloons 221, 222 shared among a multiple launcher module as depicted in FIG. 2, or with multiple storage and launch containers 111 containing hydrogen generators.

A potential non-limiting use for a deployable LTA balloon is an expendable communications relay device, provided as payload 123 (FIGS. 1F-1H). An expendable communications relay device can provide wide band communications relays, for example 30-2500 MHz, a medium-data rate, for example 50-2000 kbps, with ad hoc network formation capabilities. The expendable communications relay device can launch and restore in-theatre communications within 60 minutes and provide coverage over an 800 km diameter for a duration of 12 to 24 hours. The nature of the expendable communications relay device enables the system to be inexpensive and expendable as well as extremely difficult to detect and target with conventional weapons by hostile forces. This allows rapid restoration of communications in-theatre in the event satellite services become unavailable. The system is expected to provide continuous coverage until a longer term communications system becomes available.

Continuous coverage is achieved by launching expendable communications relay device modules in series. This concept of operations is also feasible from a cost perspective because of the low cost of the expendable communications relay device. Thus, several hundred modules could be launched before approaching the implementation cost of competing techniques.

The expendable communications relay device is also uniquely capable of being pre-staged for pre-launch deployment in areas of interest well in advance of potential conflicts. By way of example, the LTA balloon storage and launch containers could be pre-staged one or more years in advance of launch.

The expendable communications relay device utilizes a balloon based aerial platform to launch payloads to altitudes of 10,000 to 20,000 meters or higher. A lighter than air gas, for example hydrogen is used to provide lift. System volume can be minimized and storage life maximized by using a borohydride or a metal hydride to provide generation and delivery of the hydrogen. This method also allows the hydrogen to be stored without leakage indefinitely, only releasing the gas when desired through a chemical reaction in the presence of a catalyst.

Launch deployment is initiated in any convenient manner, such as manually, by providing a remote signal or by use of a timer. Launch deployment is achieved in approximately one hour. The system takes less than 15 minutes to begin to react to a signal to start launch until completion of fill, producing enough hydrogen to begin ascent. Rise to operational altitude is achieved within 45 minutes. A lightweight communications package provides the coverage specified above and is powered by an onboard power supply. The system is designed to be compact with a form-factor smaller than that of a 55-gallon drum, which allows the expendable communications relay device to be deployed from a wide variety of platforms.

While the techniques have been described in terms of underwater deployment of LTA balloons, the disclosed techniques may be used for other applications in which a LTA balloon launch is desired. The use of LTA balloons can be used to create a buoyant effect either with or without the need to establish flight. For example, the balloon can be used to lift an object or person to the surface of the water (for example the hydrogen generation apparatus 211 depicted in FIG. 2) without the need to carry a compressed gas or compressed gas containers. The balloon can also be used to provide emergency location data, and can remain tethered to an object on the surface.

Figure 3A:
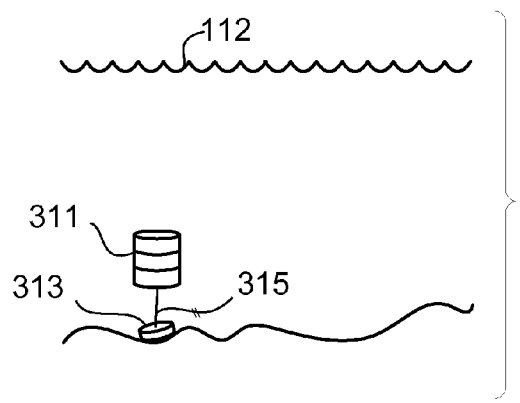
FIGS. 3A and 3B are diagrams showing a launch container which uses an anchor.
Figure 3B:
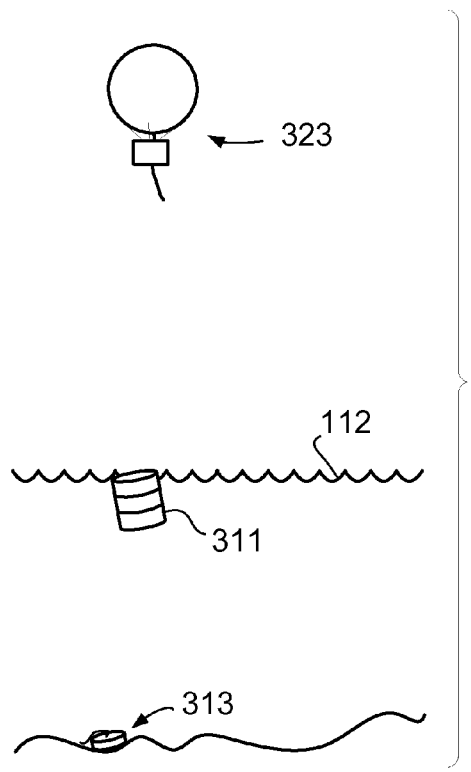

FIGS. 3A and 3B are diagrams showing a launch container 311 tethered to an anchor 313. As depicted in FIG. 3A, on initial generation of gas, container 311 becomes sufficiently buoyant to lift off of the sea floor, which causes container 311 to attain an upright position, secured by tether 315, thereby allowing the balloon 323 to deploy upward from container 311. Container 311 may remain tethered or may be allowed to untether during balloon launch, as depicted in FIG. 3B.

Figure 4:
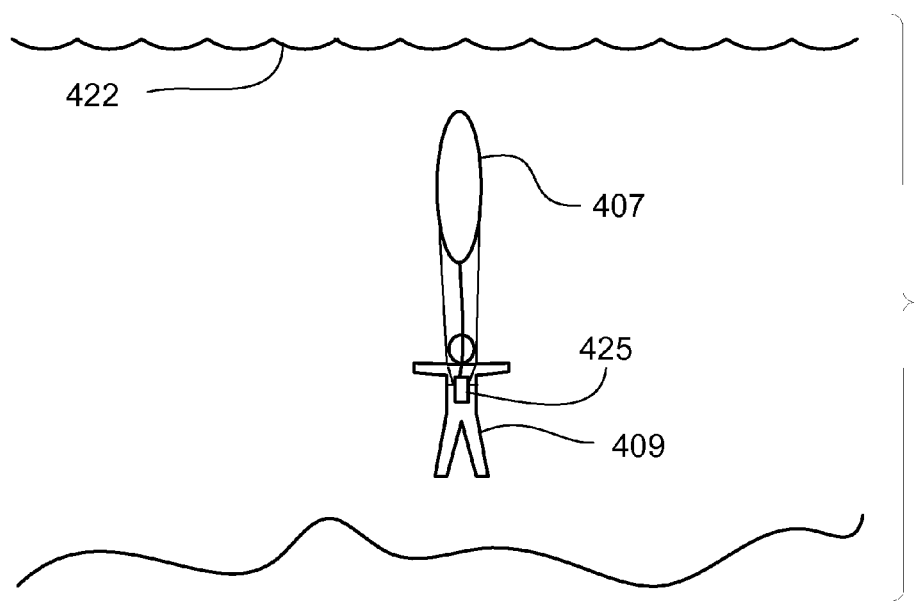
FIG. 4 is a diagram showing the use of an inflatable balloon used to bring a diver rapidly to the surface.

FIG. 4 is a diagram showing the use of an inflatable balloon 407 used to bring a diver 409 rapidly to the surface 422. A hydrogen generator pack 425 would be used to inflate balloon 407. Balloon 407 would surface and rise above the surface 422, supporting the diver 409 with the diver's head above the surface 422. This would also provide location information. The location information could be provided, for example, by providing an above-water location for emergency locator transmitter (ELT) transmissions and/or by using the balloon 407 to make the diver easy to spot.

Other uses can include use on land, in which a balloon can be used to aid in rescue by providing a readily identifiable means to locate an object on the ground. One particular use would be for escape from an avalanche. In a situation where avalanche danger is present, a person exposed to the danger would carry a hydrogen generator pack (e.g., similar to hydrogen generator pack 425 described above). The person could launch the balloon upon approach of the avalanche, and the balloon would pull the person toward the top when encountering the avalanche. The system also offers a possibility of escape from being buried by the avalanche.

It is also possible to use a single reaction to produce the hydrogen. An example of a single reaction would be the reaction of a single hydride, such as sodium borohydride:

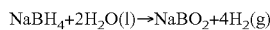

$$NaBH_4 + 2H_2O(l) \rightarrow NaBO_2 + 4H_2(g)$$

The single reaction using sodium borohydride does not compensate for heat generation, but in some applications, the heat generation could be acceptable.

Figure 5:
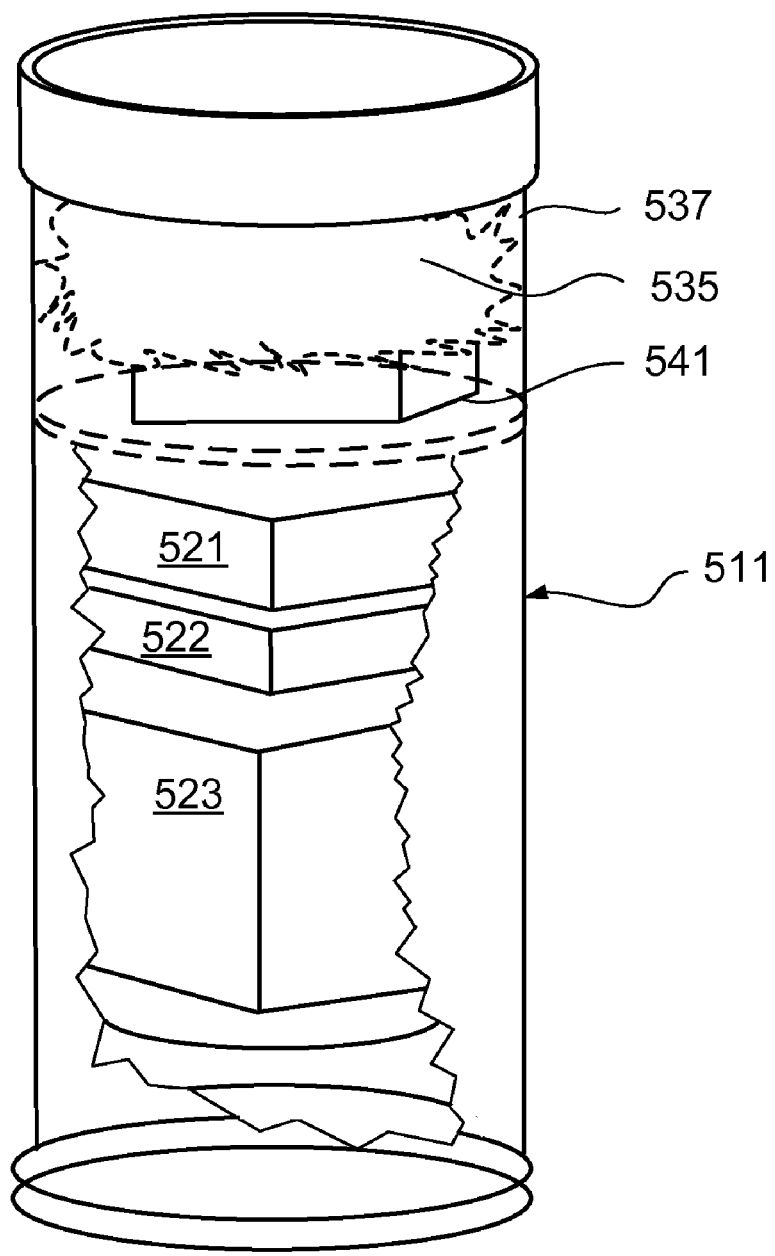
FIG. 5 is a schematic diagram showing a launch container with a hydrogen generator.

FIG. 5 is a schematic diagram showing a launch container 511. Hydrogen generator includes multiple reactant chambers 521, 522, containing, by way of non-limiting example, hydride and catalyst, respectively, or hydride and a mixture of catalyst and hydrate, respectively. The components from reactant chambers 521, 522 are mixed, for example, in chamber 523 and the reaction product (typically hydrogen) is supplied to a balloon 535 folded up in balloon chamber 537 and stored in balloon chamber 537 along with balloon payload 541. On launch, the components from reactant chambers 521, 522 are admitted to reaction chamber 523, which causes the hydrogen to be generated, and balloon 535 starts to fill. This displaces water in balloon chamber 537. Depending on the available space for balloon 535 in balloon chamber 537, launch container 511 may achieve buoyancy in water at that time, as depicted in FIG. 3. Balloon 535 is then released from balloon chamber 537 where it continues to fill (FIGS. 1A-1F) until balloon 535 is released from its fill tube (not shown).

It will be understood that many additional changes in the details, materials, steps and arrangement of parts, which have been herein described and illustrated to explain the nature of the invention, may be made by those having ordinary skill in the art within the principle and scope of the invention as expressed in the appended claims.

What is claimed is:

1. A method for deploying a lighter than air (LTA) balloon, the method comprising:
   storing the LTA balloon and payload for the LTA balloon in an underwater storage and launch container;
   providing a source for a supply of a lighter than air gas, and operatively connecting the source to the LTA balloon;
   positioning the underwater storage and launch container in an underwater location; and
   deploying the LTA balloon by filling the LTA balloon with the lighter than air gas and releasing the LTA balloon from the storage and launch container such that the LTA balloon ascends through the water to the water surface, and then to an untethered altitude of at least 10,000 meters above the water surface such that the LTA balloon is difficult to detect.

2. The method of claim 1, further comprising using, as the source for a lighter than air gas, a hydrogen generator.

3. The method of claim 1, further comprising using, as the source for a lighter than air gas, a hydrogen generator using an exothermic reaction in combination with an endothermic reaction to produce hydrogen as the lighter than air gas.

4. The method of claim 1, further comprising using, as the source for a lighter than air gas, a hydrogen generator using a compound selected from the group consisting of borohydrides and metal hydrides to produce hydrogen as the lighter than air gas.

5. The method of claim 1, further comprising:
   using, as the source for a lighter than air gas, a hydrogen generator using a borohydride in combination with an endothermic reaction using a metal hydrate, to produce hydrogen as the lighter than air gas.

6. The method of claim 1, further comprising:
   using, as the source for a lighter than air gas, a hydrogen generator using an exothermic reaction using borohydride or metal hydride in combination with an endothermic reaction using a metal hydrate, to produce hydrogen as the lighter than air gas.

7. The method of claim 1, further comprising positioning the underwater storage and launch container in the underwater location by resting or anchoring the launcher to the sea floor at the underwater location.

8. The method of claim 1, further comprising positioning the underwater storage and launch container in the underwater location by positioning the underwater launcher at a subsea location above the sea floor.

9. The method of claim 1, further comprising lifting as a payload on the LTA balloon an expendable communications relay device.

10. An underwater balloon launch assembly comprising:
    a submergible container;
    a hydrogen generator capable of providing hydrogen gas;
    a balloon stored in the submergible container and having a connection for receiving hydrogen gas, whereby supply of the hydrogen gas to the balloon results in the balloon launching underwater from the submergible container to an untethered high-altitude location of at least 10,000 meters; and
    an expendable communications relay device, provided as payload for the balloon.

11. The balloon launch assembly of claim 10, wherein the hydrogen generator comprises a hydrogen generation system using a compound selected from the group consisting of borohydrides and metal hydrides to generate hydrogen.

12. A method for deploying a high-altitude communications relay comprising:
    storing a container on a sea floor for a period of time, wherein the container comprises a wide band communications relay tethered to a deflated lighter-than-air (LTA) balloon, which is operatively coupled to a hydrogen generator;
    launching the relay by initiating generation of hydrogen by the hydrogen generator; and
    inflating the LTA balloon with the hydrogen such that the LTA balloon lifts the relay off of the sea floor, through the water to the water surface, and then to an untethered altitude of at least 10,000 meters above the water surface.

13. The method of claim 12, wherein the period of time for which the container is stored on the sea floor exceeds one year.

14. The method of claim 12, wherein the hydrogen generator is configured to use an exothermic reaction using borohydride or metal hydride in combination with an endothermic reaction using a metal hydrate, to produce hydrogen.

15. The method of claim 14, wherein the communications relay comprises ad hoc network formation capabilities.

16. The method of claim 15, wherein the step of launching the relay is initiated by sending a signal from a remote location to the container.

17. The method of claim 15, wherein the step of launching the relay is initiated by a timer.

* * * * *